US007038361B2

(12) United States Patent
Hsu et al.

(10) Patent No.: US 7,038,361 B2
(45) Date of Patent: May 2, 2006

(54) PLASMA DISPLAY PANEL STRUCTURE HAVING POLARIZATION PLATE

(75) Inventors: Yueh-Hsiang Hsu, TaoYuan (TW); Chien-Shu Lai, TaoYuan (TW); Ta-Wang Lai, TaoYuan (TW)

(73) Assignee: Optimax Technology Corporation, Tao Yuan (TW)

( * ) Notice: Subject to any disclaimer, the term of this patent is extended or adjusted under 35 U.S.C. 154(b) by 133 days.

(21) Appl. No.: 10/624,514

(22) Filed: Jul. 23, 2003

(65) Prior Publication Data

US 2004/0227466 A1 Nov. 18, 2004

(30) Foreign Application Priority Data

May 16, 2003 (TW) .............................. 92208938 U

(51) Int. Cl.
*H01J 17/49* (2006.01)
*G02B 5/30* (2006.01)

(52) U.S. Cl. ....................................... 313/112; 313/582

(58) Field of Classification Search ........ 313/582–587, 313/112; 315/169.4; 345/60
See application file for complete search history.

(56) References Cited

U.S. PATENT DOCUMENTS

| | | | | |
|---|---|---|---|---|
| 4,747,674 | A * | 5/1988 | Butterfield et al. | 359/590 |
| 6,552,486 | B1 * | 4/2003 | Wani et al. | 313/489 |
| 6,679,971 | B1 * | 1/2004 | Tone et al. | 156/306.6 |
| 6,686,896 | B1 * | 2/2004 | Oishi et al. | 345/60 |
| 2001/0002779 | A1 * | 6/2001 | Teng et al. | 313/112 |
| 2003/0012936 | A1 * | 1/2003 | Draheim et al. | 428/216 |
| 2003/0102790 | A1 * | 6/2003 | Wachi et al. | 313/112 |
| 2003/0202137 | A1 * | 10/2003 | Nakamura et al. | 349/96 |
| 2005/0180684 | A1 * | 8/2005 | Kojima | 385/16 |

* cited by examiner

*Primary Examiner*—Karabi Guharay
(74) *Attorney, Agent, or Firm*—Troxell Law Office, PLLC

(57) ABSTRACT

A plasma display panel structure having polarization plate is comprised of plasma display panel and filter, wherein the plasma display panel includes front glass and rear glass. Through the front glass, the plasma display panel displays images to the outside. The location of rear glass is corresponding to that of front glass and there is plasma enclosed between the rear glass and the front glass. The filter is a multiple-layer structure having polarization plate and is disposed upon the front glass. In this plasma display panel structure including plasma display panel having polarization plate, since the polarization plate is comprised in filter, so the showed picture is more color-contrasted and more three-dimensioned after the images showed by the plasma display panel passes through this filter.

14 Claims, 2 Drawing Sheets

PLASMA DISPLAY PANEL STRUCTURE HAVING POLARIZATION PLATE

FIELD OF THE INVENTION

The invention relates to a plasma display panel structure having polarization plate, and in particular, to a plasma display panel structure having plasma display panel, filter, and polarization plate.

BACKGROUND OF THE INVENTION

Since plasma TV has the advantages of thin size and high-quality picture, so plasma TV is deemed as a replacing product for future color TV. But, from the viewpoint of manufacturing process, since the manufacturing complexity of plasma TV is high, so it is uneasy to increase its yield, and the market of plasma TV is still majored in business application, but the future growing potential of plasma TV is expected in home electric appliances. Each of Asian manufactures is aggressively devoted into the R&D of plasma TV, including: Japan's Sony, NEC, Sharp, Pioneer, Hitachi, Mitsubishi, South Korea's LG, Samsung, and domestic manufactures, such as: Acer Display, Chunghwa Picture Tube, Sampo, Formosa Plastics, and Vtekdisplay, and so on, all which have established R&D teams to aggressively create the future market of plasma TV.

Plasma TV is mainly comprised of a piece of plasma display panel (abbreviated as PDP). The essential components of this PDP are plural cells, dimensions of which are about 100 micrometers. The cells are filled with inert gases, pressures of which are about 500 torrs under room temperature. Usually, the compositional proportion of mixture of Neon gas and Xenon gas is 90% to 10%, and fluorescencers of red, yellow, and green are respectively coated at the bottom of each cell. Display screen is comprised of matrixes of cells, in which filled inert gases will be excited when electrodes are applied for displaying images. When the plasma stored in the cells is ignited, gases' molecules are excited to emit out light waves, in which the amount of ultraviolet ray is about 10% and the fluoresencers coated at the bottom of cell absorb this ultraviolet ray and emit out colorful and visible light.

For user to avoid the radiation of electromagnetic wave and to watch a vivid picture of plasma TV, a piece of filter is disposed in plasma TV and is about 5 mm (depending upon the design of manufacture) in front of a plasma display panel emitting visible light. Since a filter usually has anti-reflecting layer, color compensating layer, electromagnetic wave shielding layer, and glass layer, etc. so, in plasma TV, after the visible light emitted from plasma display panel passes through the filter, not only may the radiation of electromagnetic wave be reduced, but also may the picture shown by visible light have a preferable color and brightness.

However, since visible light is a kind of electromagnetic wave, so those familiar with this kind of art should know that, after visible light enters the filter, except it having polarization of different directions, visible light will also generate interference and diffraction in the filter. The polarization of different directions, the interference, and the diffraction generated in the filter will all influence the pictures shown by the visible light after it passes through filter.

General speaking, there are still lots of improving rooms for the pictures that are shown under the construction of plasma display panel and filter in plasma TV. On aspect of color contrast, it is particularly worth studying.

Therefore, to improve the insufficiency of color contrast shown in the pictures according to prior plasma TV, the invention has proposed a plasma display panel structure having polarization plate that will enhance the pictures shown on plasma TV to be more color-contrasted and more three-dimensioned.

SUMMARY OF THE INVENTION

The main objective of the invention is to provide a plasma display panel structure having polarization plate. The plasma display panel structure having polarization plate is comprised of plasma display panel and filter. Wherein, the plasma display panel is further comprised of front glass and rear glass. The front glass has first face and second face. Through itself, the front glass displays the images to the outside. The rear glass also has first face and second face. The second face of rear glass is corresponding to the first face of front glass, and there is plasma enclosed between the first face of rear glass and the second face of front glass. The filter is disposed in front of the first face of front glass, and a piece of polarization plate is particularly included in the filter.

In the preferable embodiment according to the invention, the filter, except for having polarization plate, is further comprised of an electromagnetic wave shielding layer, a glass layer, and two anti-reflecting layers. Therefore, in the plasma display panel structure having polarization plate according to the preferable embodiment of the invention, the filter, facing the front glass of plasma display panel, sequentially has anti-reflecting layer, polarization plate, electromagnetic wave shielding layer, glass layer, and another anti-reflecting layer.

In another preferable embodiment according to the invention, the filter, except for having polarization plate, is further comprised of a color compensating layer, an electromagnetic wave shielding layer, a glass layer, and two anti-reflecting layers. In this another preferable embodiment of the present invention, the filter, facing the front glass, sequentially has anti-reflecting layer, polarization plate, color compensating plate, electromagnetic wave shielding layer, glass layer, and another anti-reflecting layer.

In further another preferable embodiment according to the invention, the filter, same as that of another preferable embodiment of the present invention, except for having polarization plate, is further comprised of a color compensating layer, an electromagnetic wave shielding layer, a glass layer, and two anti-reflecting layers. But, the filter, facing the front glass, sequentially and alternatively has anti-reflecting layer, glass layer, color compensating layer, electromagnetic wave shielding layer, polarization layer, and another anti-reflecting layer.

The secondary objective of the invention is to provide a plasma TV that applies above-mentioned plasma display panel structure having polarization plate. Since this plasma TV includes the a forementioned plasma display structure having polarization plate, so the picture shown on plasma TV is more color-contrasted and more three-dimensioned.

In summary, the invention provides a plasma display panel structure having polarization plate. Since the filter on plasma display panel has polarization plate, so the picture shown on plasma TV is more color-contrasted and more three-dimensioned.

BRIEF DESCRIPTION OF THE DRAWINGS

In order to make your esteemed members of reviewing committee further recognize and understand the characteristics, objectives, and functions of the present invention, a detailed description in accordance with corresponding drawings are presented as follows.

DETAILED DESCRIPTION OF THE INVENTION

Since there is still lack of color contrast and 3D feeling of picture shown on prior plasma TV, so there is a concept generated for changing the configuration of prior plasma display panel having filter. Except for the original configuration of plasma display plate having filter, a polarization plate is particularly added into the filter. Because the polarization plate itself has the characteristic for polarizing filtered light, so it is expected that the visible light emitted from the plasma display panel may make the pictures shown upon the plasma TV be more color-contrasted and more three-dimensioned.

Figure 1:
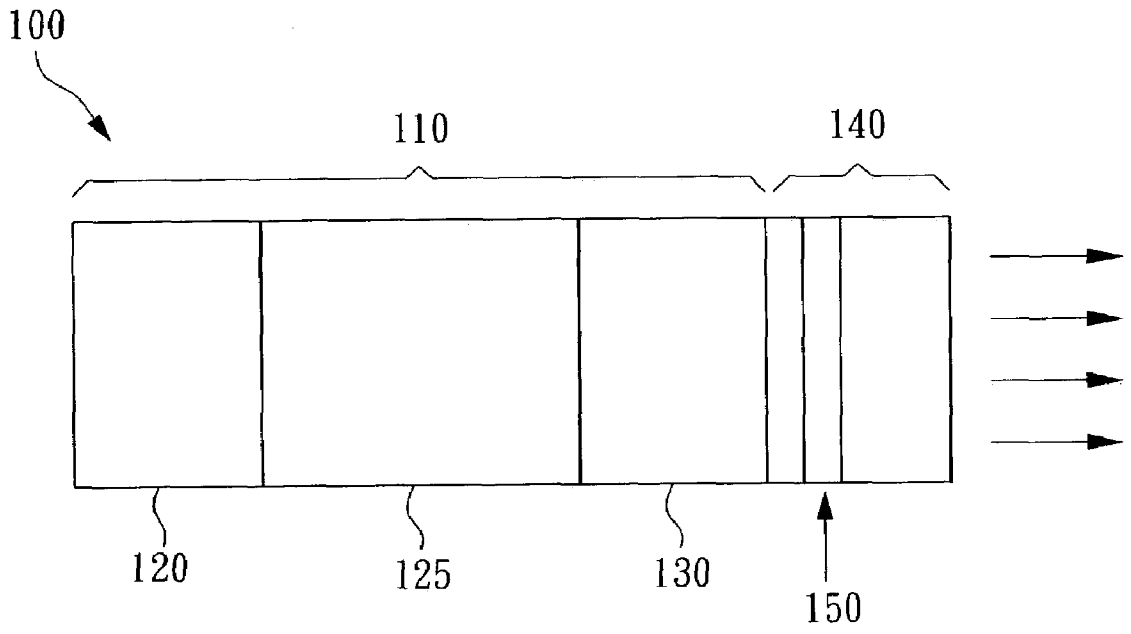
FIG. 1 shows a simple illustration for the side cross-sectional view of a plasma display panel structure having polarization plate of the preferable embodiment according to the invention.

Please refer to FIG. 1, which shows a simple illustration for the side cross-sectional view of a plasma display panel structure having polarization plate of the preferable embodiment according to the invention. The plasma display panel structure 100 having polarization plate is mainly comprised of plasma display panel 110 and filter 140. Wherein, the plasma display panel 110 has two pieces of glass 120, 130, positions of which are corresponding to each other, and between which plasma 125 is enclosed. Through glass 130, the plasma display panel 110 is defined to display images to the outside, so the filter 140 is arranged upon the glass 130 facing the outside. In the preferable embodiment according to the present invention, there is no space adapted between the filter 140 and the glass 130, but the filter is adapted for being directly formed upon the glass 130. At last, according to main concept of the invention, a polarization plate 150 is particularly added into the filter 140.

Figure 2:
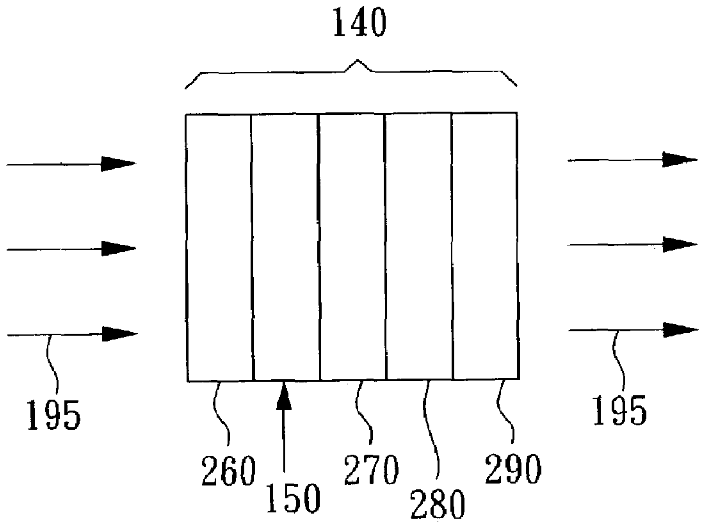
FIG. 2 shows a simple illustration for the side cross-sectional view of a filter of the preferable embodiment according to the invention.

Furthermore, please refer to FIG. 2, which shows a simple illustration for the side cross-sectional view of a filter of the preferable embodiment according to the invention. The filter 140, except for having a polarization plate 150, further has anti-reflecting layer 260, glass layer 280, and anti-reflecting layer 290. So, the visible light 195 emitted from the plasma display panel 110 shown in FIG. 1 enters the filter 140 through the anti-reflecting layer 260 and penetrates out the filter 140 again through the anti-reflecting layer 290. Those familiar with such arts should know that, after the visible light 195 enters the anti-reflecting layer 260, the anti-reflecting layer 260 may increase the transmittancy of visible light 195, but the anti-reflecting layer 260 may also generate interference or diffraction to the visible light 195. Therefore, the visible light 195 not only has polarization of different directions in the anti-reflecting layer 260, but also generates diffraction or interference due to the anti-reflecting layer 260.

After the visible light 195 leaves the anti-reflecting layer 260 and enters the polarization plate 150 with polarization of different direction, diffraction, and interference, the polarization plate 150 will polarize the visible light 195, that is, the polarization plate 150 absorbs the visible light 195 of some directions to remain the visible light 195 of specific directions, such that the polarization of different directions of the visible light 195 and the generated diffraction and interference may be removed.

Therefore, when the visible light 195 leaves the polarization plate 150 and enters the electromagnetic wave shielding layer 270, the visible light 195 is a polarized light (i.e., a light polarized in specific direction). After being polarized, when the visible light 195 passes through the electromagnetic wave shielding layer 270 and sequentially enters the following glass layer 280, the anti-reflecting layer 290, it is uneasy for the visible light 195 being interfered or diffracted.

From aforementioned description, it is known that, in the plasma display panel structure 100 having polarization plate according to the preferable embodiment of the present invention, after the visible light 195 emitted from the plasma display panel 110 passes through the filter 140 having polarization plate 150, the pictures shown on the plasma TV apparently are more color-contrasted and more three-dimensioned.

Again, please refer to Table 1, which shows the comparison numbers of bright picture and dark picture between the filter of the preferable embodiment according to the invention being added with polarization plate of circular polarization and the filters of other manufacturers.

TABLE 1

| | Bright Picture | Dark Picture | Comparing Results | Relative Percentages of Comparing Results |
|---|---|---|---|---|
| Nissin Fabric-Electric Filter | 166.30 | 4.98 | 33.4137 | 100% |
| Optimax Filter (without Polarization Plate of Circular Polarization | 162.10 | 5.43 | 29.86367 | 89.4% |
| Optimax Filter with Polarization Plate of Circular Polarization | 120.30 | 3.02 | 39.82125 | 116.7% |

From Table 1, it is known that, when the Optimax filter with polarization plate of circular polarization compares with the Optimax filter without polarization plate of circular polarization, the bright picture and dark picture of the latter become darker, but its comparing result relatively increases 28%. Additionally, comparing the Optimax filter with polarization plate of circular polarization to the Nissin Fabric-Electric filter, the comprising result of the former also relatively increases 16%.

Figure 3:
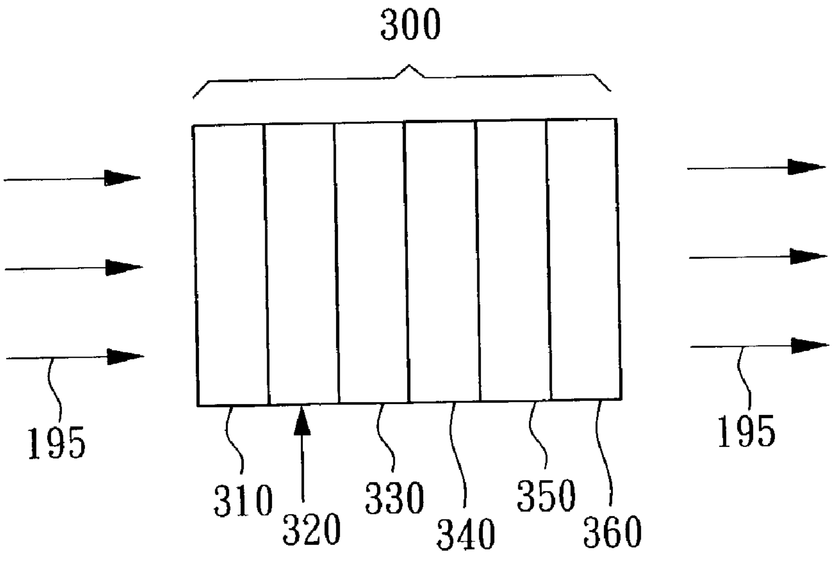
FIG. 3 shows a simple illustration for the side cross-sectional view of a filter of another preferable embodiment according to the invention.

Therefore, comparing the filtering effectiveness of the plasma display panel structure according to the preferable embodiment of the present invention that applies Optimax filter with polarization plate of circular polarization to that of plasma display panel that only applies Nissin Fabric-Electric filter or Optimax filter, the preferable embodiment of the invention is really superior on comparing result. Additionally, responding to the requirements brought by different circumstances, the invention may dispose the polarization plate at positions of different layers. Please refer to FIG. 3, which shows a simple illustration for the side cross-sectional view of a filter of another preferable embodiment according to the invention. In FIG. 3, the filter 300 has anti-reflecting layer 310, polarization plate 320, color compensating layer 330, electromagnetic wave shielding layer 340, glass layer 350, and anti-reflecting layer 360, while the polarization plate 320 is positioned between the anti-reflecting layer 310 and the color compensating layer 330.

Figure 4:
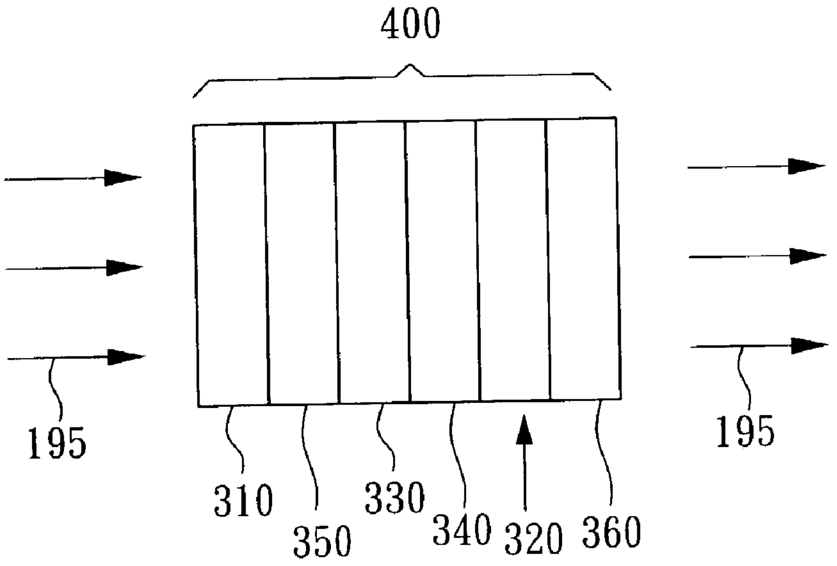
FIG. 4 shows a simple illustration for the side cross-sectional view of a filter of further another preferable embodiment according to the invention.

Then, please refer to FIG. 4, which shows a simple illustration for the side cross-sectional view of a filter of further another preferable embodiment according to the invention. In FIG. 4, the filter 400, similar to FIG. 3, has anti-reflecting layer 310, color compensating layer 330, electromagnetic wave shielding layer 340, glass layer 350, and anti-reflecting layer 360, but the polarization plate 320 is interchanged with the glass layer 350 and is positioned between the electromagnetic wave shielding layer 340 and the anti-reflecting layer 360.

Those familiar with such arts should know that, no matter is the polarization plate located in which layer, the polarization plate will filter out the all multi-directional polarization and the diffraction or interference generated by the visible light entering the filter. Therefore, after the visible light passes through the filter having polarization plate, the picture shown on the plasma TV is apparently more color-contrasted and more three-dimensioned.

In summarizing aforementioned description, the invention proposes a plasma display panel structure, having polarization plate, applicable on plasma TV. By directly forming a filter having polarization upon a plasma display panel, when the visible light emitted from the plasma display panel passes through the filter having this polarization plate, the multi-directional polarization of visible light and the generated interference and diffraction will be filtered out, so the picture shown by the visible light passing through this filter is more color-contrasted and more three-dimensioned than the prior arts.

However, aforementioned description is only preferable embodiment according to the present invention and is not any limitation constrained upon the scope of the invention. Any equivalent variation and modification made according to the claims of the invention are still not departed from the merits of the invention, and are also within the spirit and scope of the invention, so they are all regarded as further executable situations of the invention.

What is claimed is:

1. A plasma display panel structure comprising:

a) a plasma display panel, which further includes:

i) a front glass, which has a first face and a second face, and through which the plasma display panel displays images to the outside; and ii) a rear glass, which has a first face and a second face, and the first face of which is corresponding to the second face of front glass, and a plasma is enclosed between the first face of rear glass and the second face of front glass; and b) a filter, having a plurality of layers which is disposed in front of the first face of the front glass, and includes:

i) a glass layer having first and second opposite sides;

ii) two anti-reflecting layers, a first of the two anti-reflecting layers located on the first side of the glass layer, and a second of the two anti-reflecting layers spaced from the second side of the glass layer and located between the glass layer and the front glass of the plasma display panel;

iii) an electromagnetic wave shielding layer located on the second side of the glass layer; and iv) a polarization plate located between the electromagnetic wave shielding and the second of the two anti-reflecting layers, wherein the second of the two anti-reflecting layers faces toward the first face of the front glass of the plasma display panel.

2. The plasma display panel structure according to claim 1, wherein the filter and the first face of front glass are spaced apart a predetermined distance.

3. The plasma display panel structure according to claim 1, wherein the filter is directly formed upon the first face of the front glass.

4. The plasma display panel structure of claim 1, further comprising a color compensating layer located between the second side of the glass layer and the polarization plate.

5. A plasma TV, comprising:

a) a plasma display panel, which further includes:

i) a front glass, which has a first face and a second face, and through which the plasma display panel displays images to the outside; and ii) a rear glass, which has a first face and a second face, and the first face of which is corresponding to the second face of front glass, and a plasma is enclosed between the first face of rear glass and the second face of front glass; and b) a filter, having a plurality of layers which is disposed in front of the first face of the front glass, and includes:

i) a glass layer having first and second opposite sides;

ii) two anti-reflecting layers, a first of the two anti-reflecting layers located on the first side of the glass layer, and a second of the two anti-reflecting layers spaced from the second side of the glass layer and located between the glass layer and the front glass of the plasma display panel;

iii) an electromagnetic wave shielding layer located on the second side of the glass layer; and iv) a polarization plate located between the electromagnetic wave shielding and the second of the two anti-reflecting layers, wherein, the second of the two anti-reflecting layers faces toward the first face of the front glass of the plasma display panel.

6. The plasma TV according to claim 5, wherein the filter and the first face of the front glass are spaced apart a predetermined distance.

7. The plasma TV according to claim 5, wherein the filter is directly formed upon the first face of the front glass.

8. The plasma TV of claim 5, further comprising a color compensating layer located between the second side of the glass layer and the polarization plate.

9. The plasma display panel structure according to claim 5, wherein the filter is directly formed upon the first face of the front glass.

10. A plasma display panel structure comprising:

a) a plasma display panel, which further includes:

i) a front glass, which has a first face and a second face, and through which the plasma display panel displays images to the outside; and ii) a rear glass, which has a first face and a second face, and the first face of which is corresponding to the second face of front glass, and a plasma is enclosed between the first face of rear glass and the second face of front glass; and b) a filter, having a plurality of layers, and which is disposed in front of the first face of the front glass, and includes:

i) a glass layer having first and second opposite sides, the second side facing toward the plasma display panel;

ii) two anti-reflecting layers, a first of the two anti-reflecting layers located on the second side of the glass layer, and a second of the anti-reflecting layers spaced from the first side of the glass layer;

iii) a polarization plate located between the second anti-reflecting layer and the first side of the glass layer;

iv) a color compensating layer on the first side of the glass layer; and v) an electromagnetic wave shielding layer between the color compensating layer and the polarization plate, wherein, the first of the two anti-reflecting layers faces toward the first face of the front glass of the plasma display panel.

11. The plasma display panel structure according to claim 10, wherein the filter and the first face of front glass are spaced apart a predetermined distance.

12. A plasma TV, comprising:

a) a plasma display panel, which further includes:

i) a front glass, which has a first face and a second face, and through which the plasma display panel displays images to the outside; and ii) a rear glass, which has a first face and a second face, and the first face of which is corresponding to the second face of front glass, and a plasma is enclosed between the first face of rear glass and the second face of front glass; and, b) a filter, having a plurality of layers which is disposed in front of the first face of the front glass, and includes:

i) a glass layer having first and second opposite sides, the second side facing toward the plasma display panel;

ii) two anti-reflecting layers, a first of the two anti-reflecting layers located on the second side of the glass layer, and a second of the anti-reflecting layers spaced from the first side of the glass layer;

iii) a polarization plate located between the second anti-reflecting layer and the first side of the glass layer;

iv) a color compensating layer on the first side of the glass layer; and v) an electromagnetic wave shielding layer between the color compensating layer and the polarization plate, wherein, the first of the two anti-reflecting layers faces toward the first face of the front glass of the plasma display panel.

13. The plasma TV according to claim 12, wherein the filter and the first face of the front glass are spaced apart a predetermined distance.

14. The plasma TV according to claim 12, wherein the filter is directly formed upon the first face of the front glass.

* * * * *